United States Patent
Halliday (10) Patent No.: US 10,996,359 B2
(45) Date of Patent: May 4, 2021

(54) REMOVAL OF ACQUISITION EFFECTS FROM MARINE SEISMIC DATA

(71) Applicant: SCHLUMBERGER TECHNOLOGY CORPORATION, Sugar Land, TX (US)

(72) Inventor: David Fraser Halliday, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 714 days.

(21) Appl. No.: 15/572,016

(22) PCT Filed: May 4, 2016

(86) PCT No.: PCT/US2016/030636
§ 371 (c)(1),
(2) Date: Nov. 6, 2017

(87) PCT Pub. No.: WO2016/179206
PCT Pub. Date: Nov. 10, 2016

(65) Prior Publication Data
US 2018/0143338 A1     May 24, 2018

Related U.S. Application Data

(60) Provisional application No. 62/156,914, filed on May 5, 2015.

(51) Int. Cl.
| | | |
|---|---|---|
| *G01V 1/36* | (2006.01) | |
| *G01V 1/24* | (2006.01) | |
| *G01V 1/38* | (2006.01) | |

(52) U.S. Cl.
CPC .............. *G01V 1/36* (2013.01); *G01V 1/247* (2013.01); *G01V 1/38* (2013.01); *G01V 2210/32* (2013.01); *G01V 2210/56* (2013.01)

(58) Field of Classification Search
None
See application file for complete search history.

(56) References Cited

U.S. PATENT DOCUMENTS

| | | |
|---|---|---|
| 3,860,928 A | 1/1975 | Ehrlich |
| 4,020,447 A | 4/1977 | Michon et al. |

(Continued)

FOREIGN PATENT DOCUMENTS

| | | |
|---|---|---|
| CN | 101334483 A | 12/2008 |
| CN | 102053272 A | 5/2011 |

(Continued)

OTHER PUBLICATIONS

Third Office Action issued in Chinese Patent Application No. 201580025632.6, dated Jul. 25, 2019, 19 pages.

(Continued)

*Primary Examiner* — Gregory J Toatley, Jr.
*Assistant Examiner* — Terence E Stifter, Jr.

(57) ABSTRACT

Marine seismic data can be processed to remove or reduce two or more source side acquisition effects jointly when 1) the effects are placed in the same data domain as the received data and 2) the effects are described using the same basis functions which may signify representing the received data and the effects in the same chosen transform domain. The data effects may include source signature removal, source radiation pattern removal, residual shot noise suppression and data regularization, multi-channel reconstruction or regularization, prediction of sea surface multiples, separation of simultaneous sources etc. The joint processing can use iterative or non-iterative inversion technique, where the iterative inversion technique may be a matching pursuit technique.

18 Claims, 5 Drawing Sheets

(56) References Cited

U.S. PATENT DOCUMENTS

| | | | |
|---|---|---|---|
| 4,176,356 A | 11/1979 | Foster et al. | |
| 4,207,622 A | 6/1980 | Miller | |
| 4,213,132 A | 7/1980 | Davidson | |
| 4,636,956 A | 1/1987 | Garotta et al. | |
| 4,803,668 A | 2/1989 | Berryhill et al. | |
| 5,693,885 A | 12/1997 | Neidell | |
| 5,724,241 A | 3/1998 | Wood et al. | |
| 5,971,095 A | 10/1999 | Ozbek | |
| 6,182,014 B1 | 1/2001 | Kenyon et al. | |
| 6,651,007 B2 | 11/2003 | Ozbek | |
| 7,257,049 B1 | 8/2007 | Laws et al. | |
| 7,359,283 B2 | 4/2008 | Vaage et al. | |
| 7,492,665 B2 | 2/2009 | Robertsson et al. | |
| 7,817,495 B2 | 10/2010 | Ozbek et al. | |
| 8,456,950 B2 | 6/2013 | Hegna | |
| 8,547,786 B2 | 10/2013 | Griffin et al. | |
| 8,712,694 B2 | 4/2014 | Edme et al. | |
| 9,304,216 B2 | 4/2016 | Muijzert | |
| 9,310,502 B2 | 4/2016 | Ozdemir et al. | |
| 9,594,174 B2 | 3/2017 | Goujon et al. | |
| 2002/0118602 A1 | 8/2002 | Sen et al. | |
| 2005/0013194 A1 | 1/2005 | Vaage et al. | |
| 2005/0114032 A1 | 5/2005 | Wang | |
| 2008/0123467 A1 | 5/2008 | Ronnekleiv et al. | |
| 2008/0192571 A1 | 8/2008 | Vaage et al. | |
| 2008/0275649 A1 | 11/2008 | Ozdemir et al. | |
| 2009/0003132 A1* | 1/2009 | Vassallo | G01V 1/303 367/75 |
| 2010/0039892 A1 | 2/2010 | Ray et al. | |
| 2010/0211320 A1 | 8/2010 | Vassallo et al. | |
| 2010/0211321 A1 | 8/2010 | Ozdemir et al. | |
| 2010/0271904 A1 | 10/2010 | Moore et al. | |
| 2011/0069581 A1 | 3/2011 | Krohn | |
| 2011/0096625 A1 | 4/2011 | Rentsch et al. | |
| 2011/0182140 A1 | 7/2011 | Lambert et al. | |
| 2012/0188845 A1 | 7/2012 | Jeffryes | |
| 2012/0250460 A1 | 10/2012 | Edme et al. | |
| 2012/0316844 A1 | 12/2012 | Shah et al. | |
| 2013/0060544 A1 | 3/2013 | Bakker et al. | |
| 2013/0128696 A1 | 5/2013 | Vassallo et al. | |
| 2013/0135965 A1 | 5/2013 | Ji et al. | |
| 2013/0182533 A1 | 7/2013 | Rentsch-Smith | |
| 2013/0182536 A1 | 7/2013 | Vassallo et al. | |
| 2013/0308426 A1 | 11/2013 | Scarlatti et al. | |
| 2013/0329520 A1 | 12/2013 | Van Borselen | |
| 2014/0022860 A1 | 1/2014 | Van Borselen et al. | |
| 2014/0027122 A1 | 1/2014 | Meier et al. | |
| 2014/0029378 A1 | 1/2014 | Van Manen et al. | |
| 2014/0133274 A1 | 5/2014 | Muijzert et al. | |
| 2014/0200812 A1 | 7/2014 | Kitchenside | |
| 2014/0200854 A1* | 7/2014 | Eggenberger | G01V 1/003 702/189 |
| 2014/0211589 A1 | 7/2014 | Maxwell | |
| 2014/0241117 A1 | 8/2014 | Dellinger et al. | |
| 2014/0278116 A1 | 9/2014 | Halliday et al. | |
| 2014/0278119 A1 | 9/2014 | Halliday et al. | |
| 2014/0316709 A1 | 10/2014 | Ji et al. | |
| 2014/0334262 A1 | 11/2014 | Brune | |
| 2014/0355379 A1 | 12/2014 | Moldoveanu et al. | |
| 2014/0369161 A1 | 12/2014 | Sallas et al. | |
| 2014/0369163 A1 | 12/2014 | Sallas et al. | |
| 2015/0057938 A1 | 2/2015 | Krohn et al. | |
| 2015/0066374 A1* | 3/2015 | Ji | G01V 1/362 702/17 |
| 2015/0134259 A1 | 5/2015 | Vassallo et al. | |
| 2015/0276955 A1 | 10/2015 | Brune | |
| 2015/0316667 A1 | 11/2015 | Projetti et al. | |
| 2016/0109591 A1 | 4/2016 | Kamil Amin et al. | |
| 2016/0202379 A1 | 7/2016 | Sallas | |
| 2017/0075015 A1 | 3/2017 | Halliday et al. | |
| 2017/0115415 A1 | 4/2017 | Ozbek et al. | |
| 2017/0146673 A1 | 5/2017 | Goujon et al. | |
| 2017/0184746 A1 | 6/2017 | Halliday | |
| 2017/0363756 A1 | 12/2017 | El Allouche et al. | |
| 2017/0363757 A1 | 12/2017 | Halliday et al. | |
| 2018/0164461 A1 | 6/2018 | Halliday et al. | |
| 2019/0004198 A1 | 1/2019 | El Allouche et al. | |
| 2019/0079208 A1 | 3/2019 | Halliday et al. | |

FOREIGN PATENT DOCUMENTS

| | | |
|---|---|---|
| CN | 102269823 A | 12/2011 |
| EP | 0310253 A2 | 4/1989 |
| WO | 0209014 A1 | 1/2002 |
| WO | 2010093652 A2 | 8/2010 |
| WO | 2013105062 A1 | 7/2013 |
| WO | 2014130040 A1 | 8/2014 |
| WO | 2014177522 A2 | 11/2014 |
| WO | 2014179282 A1 | 11/2014 |
| WO | 2015011160 A1 | 1/2015 |
| WO | 2015109175 A1 | 7/2015 |
| WO | 2016094332 A1 | 6/2016 |
| WO | 2016168280 A1 | 10/2016 |

OTHER PUBLICATIONS

Office Action issued in U.S. Appl. No. 15/780,223 dated Jul. 21, 2020, 8 pages.

Official Action received in Russian Patent Application No. 2018123176 dated Mar. 12, 2020, 27 pages.

Examination Report under Section 18(3) issued in GB Patent Application 1900489.4 dated Jul. 24, 2020, 4 pages.

Abma, R. et al., "Popcorn shooting: Sparse inversion and the distribution of airgun array energy over time", 83rd Annual International Meeting, SEG, Expanded Abstracts, 2013, pp. 31-35.

Amundsen, L. et al., "Multicomponent ocean bottom and vertical cable seismic acquisition for wavefield reconstruction", Geophysics, 2010, 75(6), pp. WB87-WB94.

Hampson, G. et al., "Effects of Source and Receiver Motion on Seismic Data", 1990, SEG Technical Program Abstracts, pp. 859-862.

Hopperstad, J. et al., "Fundamental Principles of Isotropic Marine Source Design", B025, 70th EAGE Conference & Exhibition held in Rome, Italy 2008, 5 pages.

Hopperstad, J-F., et al., "Where is the center of a multi-depth marine source array?", 78th SEG 2008 Annual Meeting, Las Vegas, Nevada, USA, pp. 40-44.

Kristiansen, P. et al., "Deepwater OBN—Exploiting data-processing possibilities", SEG Technical Program Abstracts, 2014, pp. 4258-4262.

Linden, D. A., "A Discussion of Sampling Theorems," Proceedings of the IRE, 1959, 47(7), pp. 1219-1226.

Lomb, N. R., "Least squares frequency analysis of unequally spaced data," Astrophysics and Space Science, 1976, 39(2), pp. 447-462.

Mallat, S. et al, "Matching Pursuits with Time-Frequency Dictionaries", IEEE Transactions on Signal Processing, 1993, 41(12), pp. 3397-3415.

Moore, et al., "Simultaneous Source Separation Using Dithered Sources", SEG Las Vegas 2008 Annual Meeting, pp. 2806-2810.

Ozbek, A. et al., "Crossline wavefield reconstruction from multicomponent streamer data: Part 2—Joint interpolation and 3D up/down separation by generalized matching pursuit", Geophysics, 2010, 75(6), pp. WB69-WB85.

Ozdemir, A. K. et al., "Interpolation of Irregularly Sampled Data by Matching Pursuit," G025, EAGE Conference & Exhibition held in Rome, Italy 2008, 5 pages.

Paffenholz, J. et al., "Shear Wave Noise on OBS VZ Data—Part II Elastic Modeling of Scatters in the Seabed", Proceedings of the 75th EAGE Conference & Exhibition, 2006, 5 pages.

Papoulis, A., "Generalized Sampling Expansion", IEEE Transactions on Circuits and Systems, 1977, 24(11), pp. 652-654.

Scargle, J. D., "Studies in Astronomical Time Series Analysis II. Statistical Aspects of Spectral Analysis of Unevenly Sampled Data", Astrophysical Journal, 1982, 263, pp. 835-853.

Schalkwijk, K. M. et al., "Adaptive decomposition of multicomponent ocean-bottom seismic data into downgoing and upgoing P- and S-waves", Geophysics, 2003, 68(3), pp. 1091-1102.

(56) References Cited

OTHER PUBLICATIONS

Vassallo, M. et al., "Crossline wavefield reconstruction from multicomponent streamer data: Part 1—Multichannel interpolation by matching pursuit (MIMAP) using pressure and its corssline gradient", Geophysics, 2010, 75(6), pp. WB53-WB67.
Aki, K. et al., "Quantitative Seismology", New York: Freeman and company, 1980, 10 pages.
Van Dalen, K., "Multi-component acoustic characterization of porous media", PhD thesis, Delft University of Technology, 2011, 174 pages.
Malischewsky, P. et al., "Love's formula and H/V-ratio (ellipticity) of Rayleigh waves", Wave Motion, 2004, 40, pp. 57-67.
Halliday, D. et al., "Full-wavefield, towed-marie seismic acquisition and applications", SEG Technical Program Expanded Abstracts, 2012, pp. 1-5.
Osen, A. et al., "Removal of water-layer multiples from multicomponent sea-bottom data", Geophysics, 1989, 64(3), pp. 838-851.
Search Report and Written Opinion of International Patent Application No. PCT/US2017/037587 dated Sep. 8, 2017, 17 pages.
International Preliminary Report on Patentability of International Patent Application No. PCT/US2017/037587, dated Dec. 27, 2018, 13 pages.
Office Action issued in U.S. Appl. No. 15/624,403, dated Mar. 13, 2019, 11 pages.
Final Rejection issued in U.S. Appl. No. 15/624,403, dated Oct. 31, 2019, 11 pages.
International Preliminary Report on Patentability of International Patent Application No. PCT/US2017/037586, dated Dec. 27, 2018, 11 pages.
Office Action issued in U.S. Appl. No. 15/624,669, dated Aug. 31, 2018, 7 pages.
Search Report and Written Opinion of International Patent Application No. PCT/US2017/037586, dated Sep. 8, 2017, 14 pages.
Search Report and Written Opinion of International Patent Application No. PCT/US2016/030344, dated Sep. 21, 2016, 13 pages.
International Preliminary Report on Patentability for the equivalent International patent application PCT/US2016/030344, dated Nov. 16, 2017, 12 pages.
Search Report in European Patent Application No. 16789874.1 dated Apr. 30, 2019, 7 pages.
Office Action issued in U.S. Appl. No. 15/571,029 dated Feb. 14, 2020, 7 pages.
Search Report and Written Opinion of International Patent Application No. PCT/US2016/030636, dated Aug. 12, 2016, 15 pages.
International Preliminary Report on Patentability of International Patent Application No. PCT/US2016/030636, dated Nov. 16, 2017, 12 pages.
Search Report in European Patent Application No. 16789960.8 dated Nov. 19, 2018, 3 pages.
Exam Report in European Patent Application No. 16789960.8 dated May 16, 2019, 5 pages.
Search Report and Written Opinion of International Patent Application No. PCT/US2015/028002 dated Jul. 24, 2015, 9 pages.
International Preliminary Report on Patentability of International Patent Application No. PCT/US2015/028002, dated Nov. 10, 2016, 7 pages.
Supplementary Search Report of European Patent Application No. 15785227.8, dated Nov. 10, 2017, 3 pages.
Search Report in European Patent Application No. 15785227.8, dated Mar. 12, 2018, 7 pages.
First Office Action and Search Report issued in Chinese Patent Application No. 201580025632.6, dated Mar. 23, 2018, 21 pages.
Second Office Action issued in Chinese Patent Application No. 201580025632.6, dated Feb. 2, 2019, 18 pages.
Notice of Allowance issued in U.S. Appl. No. 15/307,742 dated Jun. 14, 2019, 9 pages.
Search Report and Written Opinion of International Patent Application No. PCT/US2016/064481, dated Mar. 17, 2017, 18 pages.
International Preliminary Report on Patentability of International Patent Application No. PCT/US2016/064481, dated Jun. 14, 2018, 15 pages.
First Chinese Office Action issued in Chinese Patent Application No. 2016800754152 dated Aug. 27, 2019, 15 pages.
Supplementary Partial European Search Report issued in European Patent Application No. 16871528.2 dated Aug. 19, 2019, 15 pages.
Extended European Search Report and Exam issued in European Patent Application No. 16871528.2 dated Jan. 3, 2020, 15 pages.
First Exam Report of GCC Patent Application No. P/2016/32488 dated Dec. 18, 2019, 6 pages.

* cited by examiner

REMOVAL OF ACQUISITION EFFECTS FROM MARINE SEISMIC DATA

This application is a 35 U.S.C. § 371 national stage filing of PCT Application Ser. No. PCT/US2016/030636 entitled, "REMOVAL OF ACQUISITION EFFECTS FROM MARINE SEISMIC DATA" which was filed on May 4, 2016. PCT Application Ser. No. PCT/US2016/030636 claims the benefit of U.S. Provisional Patent Application Ser. No. 62/156,914 entitled, "REMOVAL OF ACQUISITION EFFECTS FROM MARINE SEISMIC DATA USING A JOINT PROCESSING FRAMEWORK" which was filed on May 5, 2015, which is hereby incorporated by reference in its entirety for all purposes.

BACKGROUND

Seismic exploration involves surveying subterranean geological formations for hydrocarbon deposits. A survey typically involves deploying seismic source(s) and seismic receivers at predetermined locations. The sources generate seismic waves, which propagate into the geological formations creating pressure changes and vibrations along the way. Changes in elastic properties of the geological formation scatter the seismic waves, changing the direction of propagation and other properties of the seismic waves. Part of the energy emitted by the sources is reflected back from the geological formations towards the surface and reaches the seismic receivers. Some seismic receivers are sensitive to pressure changes e.g. hydrophones), others to particle motion (e.g., geophones), and surveys may deploy only one type of receiver or both. In response to the detected seismic events, the receivers generate electrical signals to produce seismic data. Analysis of the seismic data can be processed to indicate the presence or absence of probable locations of hydrocarbon deposits. Additionally, seismic sources and receivers may be used to monitor hydrocarbon production from a subterranean reservoir and/or other fluid flow within the reservoir.

Some surveys are known as "marine" surveys because they are conducted in marine environments, although "marine" surveys may be conducted not only in saltwater environments, but also in fresh and brackish waters. In one type of marine survey, called a "towed-array" survey, an array of seismic receiver-containing streamers is towed behind a survey vessel which also tows one or more seismic sources. A possible alternative, or addition, to the use of towed streamers is the use of ocean bottom cables or ocean bottom nodes which contain seismic receivers. Unlike streamers, these lay on the sea bed and do not move during a seismic survey. In such a survey the seismic sources may be towed by a vessel. There are also survey procedures in which the seismic sources are stationary (e.g. attached to a moored buoy).

Regardless of whether the receivers and seismic source(s) are moving or stationary, the received data can incorporate effects resulting from the methodology used to generate the seismic waves which penetrate into the undersea geological formation. These source-side acquisition effects include signatures of the seismic sources, radiation patterns, residual shot noise, data irregularity, sparse data sampling, effects from the use of more than one seismic source, effects from motion of the seismic source (if it is moving while data is being acquired) and the effect of the water surface above the seismic source(s). It is conventional that the seismic data collected at the receivers (i.e. the seismic measurements made by the receivers) is subject to data processing to remove or reduce artefacts which do not result from the features of the geological formations which are being surveyed. More specifically the source-side acquisition effects mentioned above are typically removed from the data in a sequence of stages, dealing with each acquisition effect in turn, before proceeding to the next, as part of a conventional seismic data processing sequence.

In the context of processing data for effects acting on the signals reflected back to the geological formations to the receivers, Ozbek et al. (U.S. Pat. No. 7,817,495 and also in "Crossline wavefield reconstruction from multicomponent streamer data: Part 2—Joint interpolation and 3D up/down separation by generalized matching pursuit", Geophysics, Vol. 75, No. 6, WB69-WB85 (2010)) have disclosed a method in which the receiver-side ghost from reflections at the surface is removed from the data, and the data are simultaneously interpolated onto a dense grid of receiver positions.

SUMMARY

This summary is provided to introduce concepts that are disclosed in this application and further described/exemplified below in the detailed description. This summary is not intended to be used as an aid in limiting the scope of the claimed subject matter.

As mentioned above, it may be desirable to process received seismic data to reduce or remove effects resulting from the process of data acquisition. Source-side effects may be addressed in a sequence of processing stages. Now disclosed herein is a method for processing seismic measurements from a marine seismic survey, comprising processing the seismic measurements to reduce two or more acquisition effects contained in the data wherein these acquisition effects are in the same data domain and are reduced or removed in the same processing step. The method may be carried out using a computer processor and may comprise representing the seismic measurements and a plurality of acquisition effects in the same data domain and by the same set of basis functions and processing the measurements and acquisition effects, when represented by these basis functions, to remove a plurality of the acquisition effects from the seismic measurements concurrently. The method may then include outputting the processed seismic measurements. Output may be through an interface of the computer processor and may go to a display device, to computer memory or other data storage, or to communications equipment for transmitting the processed data to some other location.

The method may include receiving seismic measurements from sensors or receiving recorded seismic data through an interface of the computer processor.

In another aspect the method carried out using a computer processor may comprise representing the seismic measurements and a plurality of acquisition effects in the same data domain and also representing the seismic measurements and plurality of acquisition effects to remove the plurality of acquisition effects from the seismic measurements concurrently.

In another aspect the present disclosure may include performing a marine seismic survey of subterranean geological formations below the sea bed by emission of acoustic energy from at least one seismic source and receiving seismic signals at a plurality of receivers, characterized by processing the received seismic data by a method as any stated above.

In a further aspect, there is disclosed a system comprising an interface to receive measurements from a marine seismic survey; and a computer processor to represent the received seismic measurements and a plurality of acquisition effects in the same data domain and by the same set of basis functions; process the thus-represented measurements and acquisition effects to remove a plurality of the acquisition effects from the seismic measurements concurrently, and output the processed seismic measurements.

DESCRIPTION

The ensuing description provides some embodiment(s) of the invention and is not intended to limit the scope, applicability, or configuration of the invention or inventions. Various changes may be made in the function and arrangement of elements without departing from the scope of the invention as set forth herein. Some embodiments may be practiced without all the specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Some embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure and may start or end at any step or block. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1:
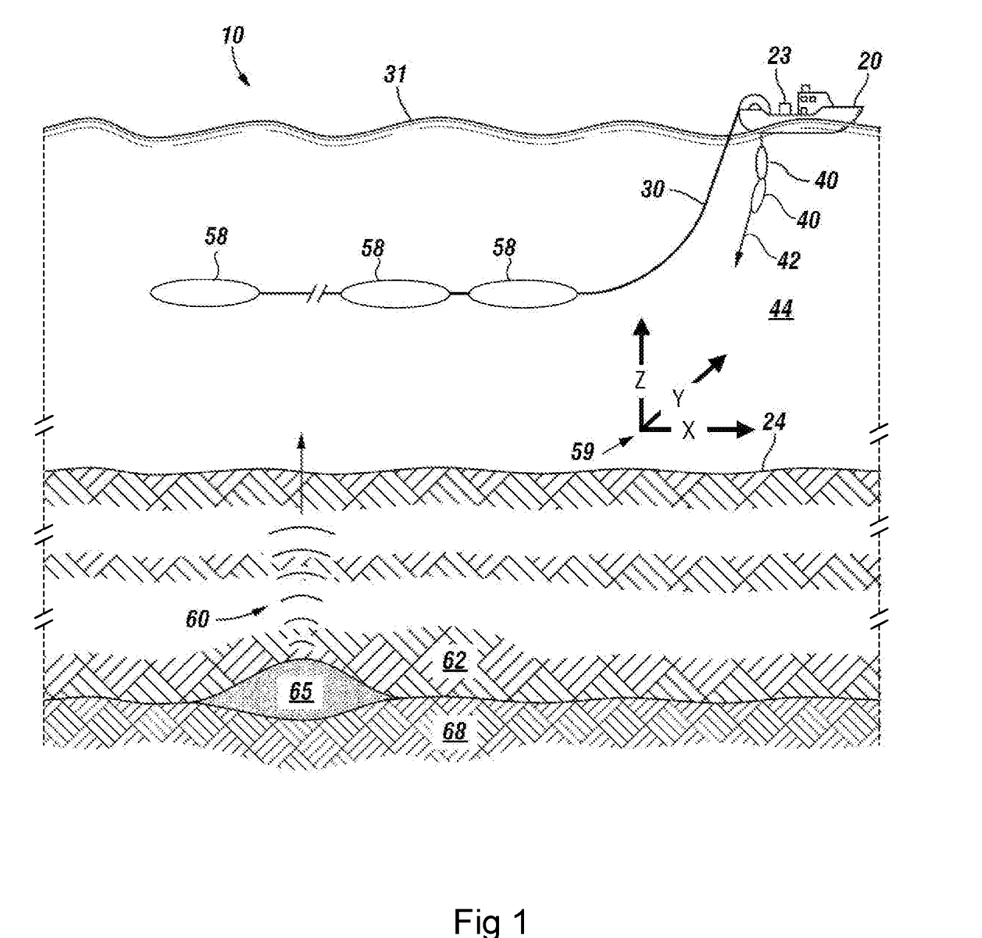
FIG. 1 schematically illustrates a marine seismic survey system with towed streamers.

FIG. 1 depicts a marine-based seismic data acquisition system 10. In the system 10, a survey vessel 20 tows one or more seismic streamers 30 (one streamer 30 is depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which are mounted seismic sensors that record seismic signals. The streamers 30 contain seismic sensors 58, which may be hydrophones to acquire pressure data or multi-component sensors. For example, sensors 58 may be multi-component sensors, each sensor may be capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (as indicated by axes 59, for example)) of a particle velocity and one or more components of a particle acceleration.

The multi-component seismic sensor may include one or more hydrophones, geophones, particle displacement sensors, particle velocity sensors, accelerometers, pressure gradient sensors, or combinations thereof.

The marine seismic data acquisition system 10 includes one or more seismic sources 40 (two seismic sources 40 being depicted in FIG. 1) for emitting acoustic signals. Possibilities for these sources include air guns, and marine vibrators. The seismic sources 40 may be coupled to, or towed by, the survey vessel 20. The seismic sources 40 may operate independently of the survey vessel 20, in that the sources 40 may for instance be coupled to other vessels or attached to buoys.

As the seismic streamers 30 are towed behind the survey vessel 20, acoustic signals 42 (an acoustic signal 42 being depicted in FIG. 1), often referred to as "shots," are produced by the seismic sources 40 and are directed down through a water column 44 into strata 62 and 68 beneath a water bottom surface 24.

The incident acoustic signals 42 that are generated by the sources 40 are reflected from the various subterranean geological formations, such as a formation 65 that is depicted in FIG. 1. The reflected acoustic signals, or pressure waves 60, are sensed by the seismic sensors 58. It is noted that the pressure waves that are received and sensed by the seismic sensors 58 include "up going" pressure waves that propagate to the sensors 58 without reflection from the air-water boundary 31, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. It is noted that while the physical wavefield is continuous in space and time, traces are recorded at discrete points in space which may result in spatial aliasing. The traces are recorded and may be at least partially processed by a signal processing unit 23 that is deployed on the survey vessel 20, in accordance with some embodiments. For example, a particular seismic sensor 58 may provide a trace, which corresponds to a measure of a pressure wavefield by its hydrophone; and the sensor 58 may provide (depending the sensor configurations) one or more traces that correspond to one or more components of particle motion.

Figure 2:
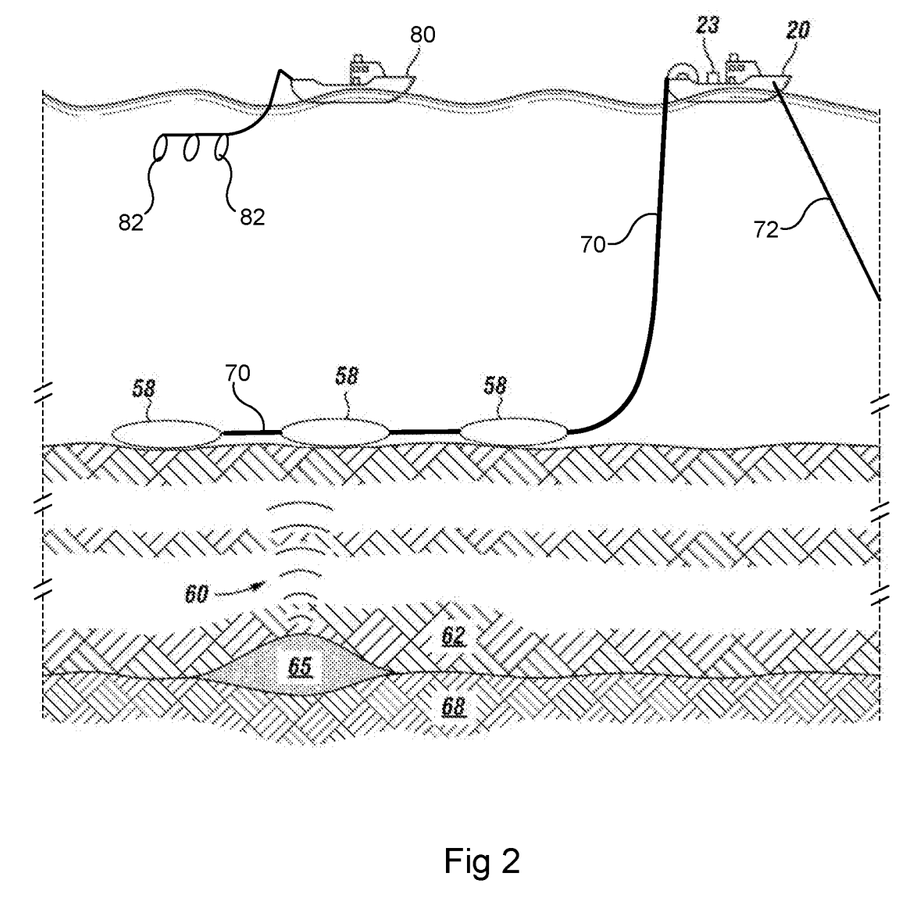
FIG. 2 schematically illustrates a marine seismic survey system with ocean bottom cables.

FIG. 2 depicts a survey in which the system 10 uses ocean bottom cables. The survey vessel 20 deploys one or more cables 60 which are not buoyant and lie stationary on the sea bed while the survey is carried out. The cables may be laid so as to lie along approximately parallel lines. If the cables 70 remain connected to the survey vessel 20 while the survey is carried out, the vessel also remains stationary. In the drawing the anchor chain of the vessel is indicated at 72. The ocean bottom cables 70 are analogous to streamers in that they contain sensors 58 which may be multi-component sensors, each capable of detecting a pressure wavefield and at least one component of a particle motion that is associated with acoustic signals that are proximate to the sensor. As with the survey shown in FIG. 1, the seismic sensors 58 lie in the path of acoustic signals reflected upwardly from the geological formations and generate signals called "traces," which indicate the acquired measurements of the pressure wavefield and particle motion. The traces are recorded and may be at least partially processed by a signal processing unit 23 that is deployed on the survey vessel 20.

Figure 3:
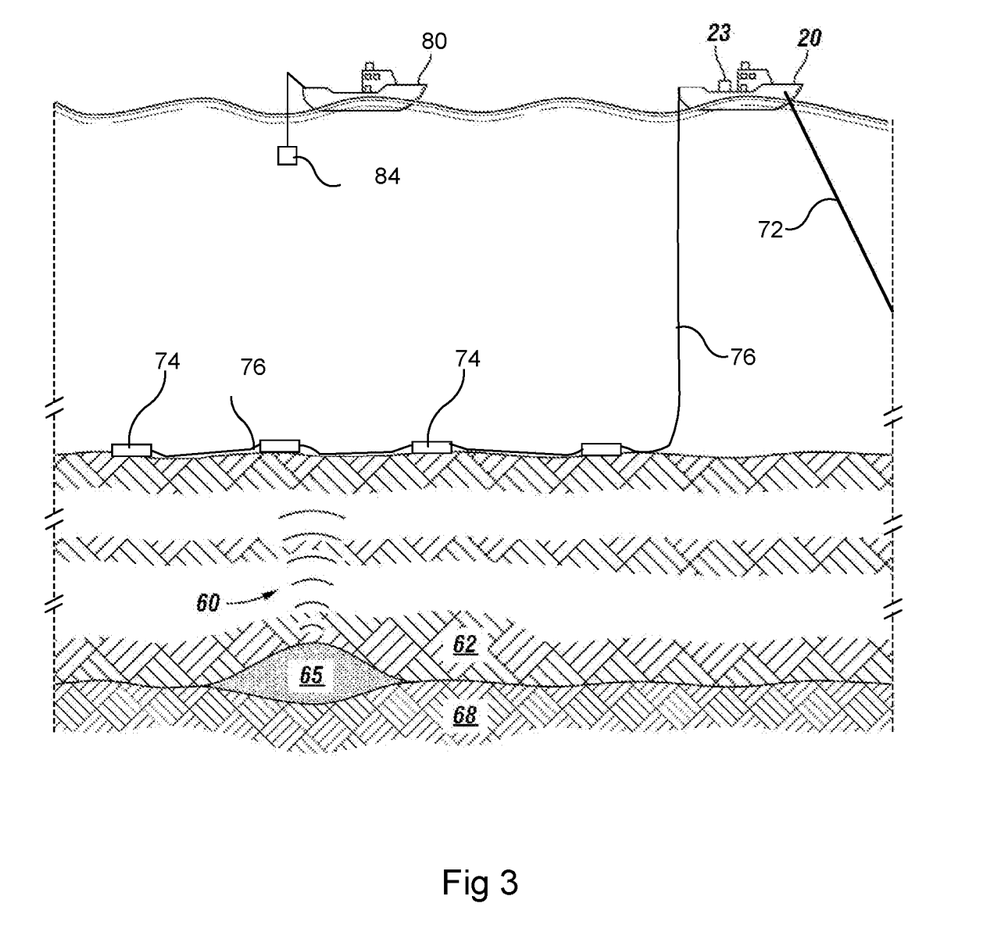
FIG. 3 schematically illustrates a marine seismic survey system with ocean bottom nodes.

FIG. 3 schematically depicts a survey in which the sensors 58 are enclosed within housings 74, termed "nodes" which are placed on the seabed in a two dimensional array and may be connected together and to the survey vessel 20 by data cabling and/or by rope 76. The nodes 74 record seismic traces in similar fashion to the sensors 58 within ocean bottom cables 70 but if the nodes 74 are not connected to the survey vessel 20 by cabling, they must be constructed to be able to record the seismic traces until the survey has been carried out and the nodes 74 are recovered by the survey vessel.

In the surveys of FIGS. 2 and 3 the seismic sources are attached to a separate vessel 80. In FIG. 2 the vessel 80 is shown towing an array of airguns 82 whereas in FIG. 3 the vessel tows a marine vibrator 84. It will of course be understood that airguns could be used for the surveys of FIGS. 1 and 3 as well as that of FIG. 2, while one or more marine vibrators could be used as the seismic sources for the surveys of FIGS. 1 and 2 as well as that of FIG. 3.

Different types of seismic sources have different characteristics. When an air gun is activated it releases compressed air to produce a pulse of acoustic energy. A vibrator produces acoustic energy based on oscillating movement of a vibrating element and emits that energy over a period of time under control by an activation signal, which can be a sinusoidal wave signal or other type of signal that causes oscillating movement of the vibrating element. The phase of the activation signal can be controlled if required.

A particular seismic source may be formed from an array of seismic source elements (such as air guns, for example) that may be arranged in strings (gun strings, for example) of the array. A marine vibrator may be an array of vibrators rather than a single vibrator. When a seismic source is provided by an array of sources, it is possible that the seismic source for an individual shot may be a subset of the sources in an array, an entire array or multiple arrays. Regardless of the particular composition of the seismic sources, the sources may be fired in a particular time sequence during the survey.

The seismic sources 40 may be fired in a sequence such that multiple seismic sources 40 may be fired simultaneously or near-simultaneously in a short interval of time so that a composite energy signal that is sensed by the seismic sensors 58 contains a significant amount of energy from more than one seismic source 40. In other words, the seismic sources interfere with each other such that the composite energy signal is not easily separable into signals that are attributable to the specific sources. This type of seismic survey is referred to as simultaneous sources survey. The composite data that are acquired by the seismic sensors 58 may be separated, in accordance with the present disclosure, into datasets that are each associated with one of the seismic sources 40 so that each dataset indicates the component of the composite seismic energy signal that is attributable to the associated seismic source 40.

The objective of seismic data acquisition is to build up an image of a survey area for purposes of identifying subterranean geological formations, such as the geological formation 65. Subsequent analysis of the image may reveal probable locations of hydrocarbon deposits in subterranean geological formations. Part of this technology may be processing of data received from the sensors, by means of a seismic data processing system. As mentioned above, and depending on the particular survey design, at least part of the seismic data processing may be performed on the seismic survey vessel 20, such as by the signal processing unit 23. Part or all of the seismic data processing may, for example, be performed by a system located on land.

In seismic data processing there are many source-side acquisition related effects that may be, and desirably should be, removed from the data prior to further processing. For example, when acquiring data with a marine vibrator seismic source, these effects can include source signatures and radiation patterns, source motion (because the source is changing position during the interval in which vibration occurs), data irregularity, sparse data sampling, residual shot noise, use of multiple simultaneous sources and the effect of the free surface. The last of these is specific to marine surveys: acoustic energy from the seismic source travels downwardly toward the sea bottom and the geological formations beneath. Acoustic energy from the source also travels upwardly and is reflected back from the water surface. This reflected, downwardly traveling seismic wavefield from the air-water interface causes interference with the wavefield that travels directly downwards from the source, resulting in undesirable ghost notches in the source wavefield (and potentially sea surface multiples). When airguns are used, the acquisition related effects may include many of the above effects and others, such as source signature. The goal of data processing can be to have an output dataset sampled on a desired (regular) grid of source and receiver points, representative of a point source so that the output data set is independent of the seismic source.

Typically, these acquisition effects would be removed from the data in a sequence of stages as part of a conventional seismic data processing sequence. This is an effective way of processing data because when treating each acquisition effect in turn, tailor-made processing algorithms can be applied for each. However, it can be time consuming to perform each process to remove each individual acquisition related effect when there are more than a couple of effects. Another drawback of this type of sequential processing is that errors introduced by one processing step can impact on the result of a later processing step.

The present inventor has recognized that a number of acquisition effects can be described in the same data domain, and solved using similar methods. In the present disclosure, a joint processing framework is used. Multiple acquisition effects are accounted for simultaneously. Treating these effects simultaneously may be more efficient, and may also prevent errors from an earlier processing step affecting results at a later processing step.

Methods to remove or reduce an acquisition effect in seismic data may be applied to data which is initially in a time and space data domain (e.g. common-shot gather, common-receiver gather, common-offset gather and other such domains where the data has values in time and space). Methods may use a transformation of the data into another domain which may be referred to as a transform domain. For example, this transform domain could be the frequency-slowness domain, the tau-p domain, the frequency-wavenumber domain, curvelet domain, wavelet domain, and so on. In existing methods the choice of transform domain may be specific to the particular acquisition related effect being accounted for.

It is known that seismic measurements can be modelled as a linear combination of basis functions, as for instance mentioned in US 2013/0128696. Each basis function may constitute one element in a transform domain and each basis function may represent one particular model that contributes to the description of the data.

A basis function can represent the underlying wavefield (e.g., the wavefield without any acquisition effects) The present inventor has appreciated that it is possible for an acquisition effect to be described using a basis function (or by some linear combination of basis functions) and it is also possible for the desired data (without the acquisition effect) to be described using the same basis functions. A method may then operate by matching the input data to the basis functions describing the input data, representing an acquisition effect using the same basis functions, using mathematical operators to remove the acquisition effect while represented as basis functions and thereby arrive at the equivalent basis functions describing the desired output data with the acquisition effect removed.

This could be done for individual acquisition effects in turn and this will be exemplified below for the purpose of explanation, but in accordance with the present disclosure multiple acquisition effects can be modelled and removed using the same basis functions. The removal may be done in a transform domain.

For purposes of further explanation, processing of seismic data will now be described, for a seismic survey in which the seismic source is a marine seismic vibrator and the seismic signals are received and recorded using a system of ocean bottom nodes (although similar joint processing frameworks could be applied to towed streamer seismic data).

Wavefield generation using a marine seismic vibrator, including the generation of source gradient wavefields, is described in co-pending patent application, PCT/US15/021520 filed on 19 Mar. 2015 and published as WO2015/143189, titled "WAVEFIELD GENERATION USING A SEISMIC VIBRATOR ARRAY," which is incorporated by reference herein.

Source side acquisition effects present when data have been acquired with a marine vibrator may include (but are not limited to) source motion correction, source signature removal, residual shot noise attenuation, and source-side reconstruction and regularization (which is the removal of effects consequent upon positioning of seismic sources). Note that the source signature term can include the directional part of the signature which also contains the source ghost term. In this example the source array is configured such that no ghost notches are present (as taught in U.S. Pat. No. 7,257,049 B1).

Each of the data effects can be fully observed and/or described in a common-node gather data domain defined as a 3D gather (i.e., with source x- and y-coordinates and with time being the $3^{rd}$ dimension). From this data domain, it is possible to describe each of the above mentioned acquisition effects using the frequency-slowness ($f$-$p_x$-$p_y$) transform.

The source signature is described as a 3D radiation pattern $S(f, p_x, p_y)$. If the marine vibrator source has a linear sweep, then source motion is dependent on frequency, source position, and slowness. So, for example, if the motion is in the x-direction, and the deviation from the true source position for frequency f is $\Delta x_f$, then the source motion can be described by $M(f, x_+ \Delta x_f, p_x)$ The residual shot noise can be encoded using a phase sequencing method (see WO2014/152106), and described using the corresponding phase term, $\varphi$ in the set of basis functions $D^{rsn}(f, x^{rsn}, y^{rsn}, p_x, p_y, \varphi)$ where $x^{rsn}$ and $y^{rsn}$ are the co-ordinates of the source at the time the residual shot noise was emitted (e.g., the source location preceding the current source location).

The reconstruction and regularization problem can be solved by finding the model components that describe the data on the acquisition grid using the basis functions $D(f, x, y, p_x, p_y)$, and combining those components with the basis functions describing the regular output data $D(f, x^d, y^d, p_x, p_y)$, where $x^d$ and $y^d$ are the co-ordinates of the desired regular output data.

Thus, each of the effects to be accounted for is dependent on combinations of the source x- and y-co-ordinates, frequency, and the slowness in x- and y-directions. Consequently (1) each of the effects can be observed/described in the same data domain (the common-node gather), and (2) each of the effects can be described using the same basis functions and hence in the same transform domain (the $f$-$p_x$-$p_y$ domain).

Figure 4A:
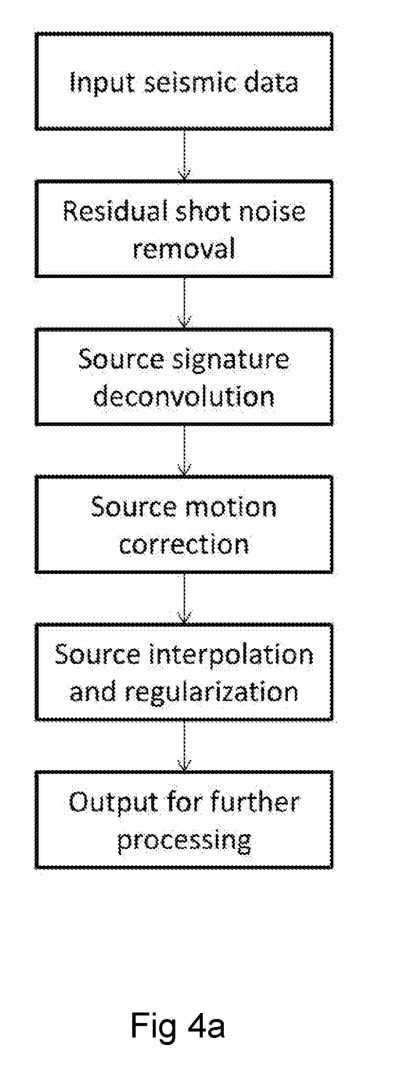
FIG. 4(a) exemplifies a processing flow to remove source-related acquisition effects from seismic data in a sequence of steps, handling a different acquisition effect in each step.

For purpose of explanation it will be shown how each of these acquisition effects could be removed individually, in a sequence of four data processing steps as shown schematically by FIG. 4(a).

Source Radiation Pattern

Consider the source radiation pattern, if we define the input data as d(f, x, y), we can describe the data as:

$$d(f,x,y)=\Sigma_{i,j}m(f,p_{xi},p_{yj})S(f,p_{xi},p_{yj})D(f,x,y,p_{xi},p_{yj}) \quad (1)$$

Given the input data, d(f, x, y), the description of the known source signature $S(f, p_{x_i}, p_{y_j})$ and the known basis functions $D(f, x, y, p_{x_i}, p_{y_j})$, the model $m(f, p_{x_i}, p_{y_j})$ can be solved for using an inversion method. Here, the model $m(f, p_x, p_y)$ is represented in the chosen transform domain (the frequency-slowness domain). Some inversion methods will explicitly compute the transform of the data into that domain using the basis functions in order to identify the corresponding model values. In other inversion methods the transform of the data is implicit the transform may never be directly computed, but the characteristics of the transform domain are still utilised. After solving for the model, the data without the source signature, $d^{SS}(f, x, y)$, are then computed as:

$$d^{SS}(f,x,y)=\Sigma_{i,j}m(f,p_{x_i},p_{y_j})D(f,x,y,p_{x_i},p_{y_j}) \quad (2)$$

Source Motion

If the data are acquired as the seismic source(s) are towed along lines (referred to as "acquisition lines") in the x-direction, then the source motion correction can be applied independently for each of these lines. Therefore, the y-coordinate does not appear in the following, and it is assumed that the processing is applied separately for each of the source acquisition lines.

For the source motion, we can describe the data as, $$d^{SS}(f,x)=\Sigma_i m(f,p_{x_i})M(f,x+x_f,p_{x_i})D(f,x,p_{x_i}) \quad (3)$$

Solving for the model $m(f, p_{x_i})$, the data without source motion, $d^{mot}(f, x)$, can then be computed as:

$$d^{mot}(f,x)=\Sigma_i m(f,p_{x_i})D(f,x,p_{x_i}) \quad (4)$$

Residual Shot Noise

The residual shot noise separation problem is similar to a simultaneous source separation problem. Assuming all the acquisition lines have been processed in the previous step, the input data $d^{mot}(f, x, y)$ is split into two parts:

$$d^{mot}(f,x,y)=d^{cr}(f,x,y)+d^{rsn}(f,x^{rsn},y^{rsn}), \quad (5)$$

where $d^{cr}(f, x, y)$ is the data corresponding to the current source, and $d^{rsn}(f, x^{rsn}, y^{rsn})$ is the part of the data consisting of the residual shot noise. The combined data is then described as, $$d^{mot}(f,x,y)=\Sigma_{i,j}m^{cr}(f,p_{x_i},p_{y_j})D(f,x,y,p_{x_i},p_{y_j})+\Sigma_{i,j}m^{rsn}(f,p_{x_i},p_{y_j})D^{rsn}(f,x^{rsn},y^{rsn},p_{x_i},p_{y_j},\varphi) \quad (6)$$

Here, the first term on the right hand side describes the data corresponding to the current source, and the second term corresponds to the energy present due to the previous source (residual shot noise). As in the previous steps, this equation can be solved to find the models, $m^{cr}(f, p_{x_i}, p_{y_j})$ and $m^{rsn}(f, p_{x_i}, p_{y_j})$. Since this is similar to a simultaneous source problem, the choice of phase shift $\varphi$ is critical. In some cases, it may be useful to apply a "sparseness" constraint (e.g. as in Moore et al (2008) "Simultaneous source separation using dithered sources" SEG Technical Program Expanded Abstracts, 2806-2810), corresponding to finding a solution that is penalized by the L1 norms of $m^{cr}(f, p_{x_i}, p_{y_j})$ and $m^{rsn}(f, p_{x_i}, p_{y_j})$. Having found the models corresponding to both the current source and the residual shot noise, the data with residual shot noise removed, $d^{nrsn}(f, x, y)$, can be constructed as:

$$d^{nrsn}(f,x,y)=\Sigma_{i,j}m^{cr}(f,p_{x_i},p_{y_j})D(f,x,y,p_{x_i},p_{y_j}) \quad (7)$$

Data Regularization

Finally, the data reconstruction/regularization is solved in similar fashion. The acquired data is described as $$d^{nrsn}(f,x,y)=\Sigma_{i,j}m(f,p_{x_i},p_{y_j})D(f,x,y,p_{x_i},p_{y_j}) \quad (8)$$

Again, solving for $m(f, p_{x_i}, p_{y_j})$ allows the data to be output with a new (reconstructed and/or regularized) geometry:

$$d^{reg}(f,x^d,y^d)=\Sigma_{i,j}m(f,p_{x_i},p_{y_j})D(f,x^d,y^d,p_{x_i},p_{y_j}) \quad (9)$$

Figure 4B:
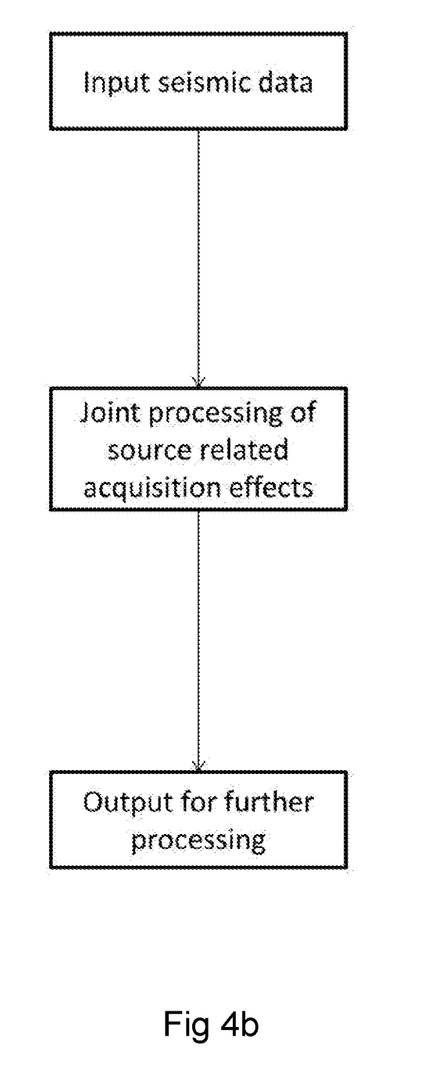
FIG. 4(b) exemplifies a processing flow that uses the joint processing framework from various embodiments of the current disclosure.

Next, it will be shown how each of these steps can be solved simultaneously, in accordance with the novel concepts of this disclosure, as shown schematically in FIG. 4b.

Joint Processing Framework

In the above process as shown in FIG. 4a, each acquisition effect was described and corrected for independently. However, since each of these effects was described in the common-node domain, and each used the frequency-slowness domain as the transform domain (which means that the same basis functions were employed) they can be processed jointly, solving each of these (previously sequential) steps together in a single step.

In this case, we define the data as:

$$d(f,x,y)=\Sigma_{i,j}m^{cr}(f,p_{x_i},p_{y_j})S(f,p_{x_i},p_{y_j})M(f,x+x_f(y),p_{x_i})D(f,x,y,p_{x_i},p_{y_j})+\Sigma_{i,j}m^{rsn}(f,p_{x_i},p_{y_j})D^{rsn}(f,x^{rsn},y^{rsn},p_{x_i},p_{y_j},\varphi). \quad (10)$$

Where now the first term on the right hand side describes the data corresponding to the current source, describing:

Source signature and radiation pattern effects,
Source motion, and
Input data geometry.

The terms $D(f, x, y, p_{x_i}, p_{y_j})$ and $D^{rsn}(f, x^{rsn}, y^{rsn}, p_{x_i}, p_{y_j}, \varphi)$ are basis functions, as before.

The source motion increment is now also a function of the y-coordinate, as the motion may be different for each acquisition line (the direction in which the seismic source is towed may change from line to line).

The second term on the right hand side describes the data corresponding to the residual shot noise. Note that this term could be further expanded to define the same effects as the first term of the right hand side (as these equally affect the residual shot noise).

As above, having solved for $m^{cr}(f, p_{x_i}, p_{y_j})$ and $m^{rsn}(f, p_{x_i}, p_{y_j})$ the output data can be computed as:

$$d^{reg}(f,x^d,y^d)=\Sigma_{i,j}m(f,p_{x_i},p_{y_j})D(f,x^d,y^d,p_{x_i},p_{y_j}). \quad (11)$$

where now the data have been output onto the desired (reconstructed and/or regularized) source grid. Thus the output data has each of the above mentioned acquisition effects removed concurrently.

An additional outcome of this form of data processing is, that the residual shot noise which was removed as an acquisition effect can be reconstructed as:

$$d^{rsn}(f,x^d,y^d)=\Sigma_{i,j}m^{rsn}(f,p_{x_i},p_{y_j})D^{rsn}(f,x^d,y^d,p_{x_i},p_{y_j},0). \quad (12)$$

The phase term is now constant with a value of zero. This residual shot noise may be used for further processing, for example, the separated residual shot noise may be appended to the appropriate records to provide a longer record length. For example, if the shot interval is 5 seconds, the separated residual shot noise may allow the output data to be extended to 10 seconds.

With the joint process, source-side acquisition related effects can be removed resulting in seismic measurements without source acquisition effects which can represent the subsurface more accurately. Although the above description is focused on a joint process for removing source side acquisition effects, as long as the effects/processes satisfy the two criteria identified above, other processes may be joined into the joint process as well. One instance arises if an array of marine vibrators is configured such that the spatial sampling of the data varies for different frequency bands. This frequency dependent sampling can be described by the above framework, and the output data can be regularized onto the same sampling grid.

Something else which can be incorporated into the joint processing is a multi-channel reconstruction, to create (interpolate) sources at new positions, that were not recorded during the survey.

Multi-Channel Reconstruction

Multi-channel reconstruction refers to the use of multiple types of measurement to reconstruct seismic data. This type of method has been proposed and used on the receiver side (e.g., in U.S. Pat. No. 7,817,495 of Ozbek et al.), where the multiple measurements are pressure data and accelerometer data. Until recently it has been difficult to generate multiple component wavefields by means of a seismic source. However, in the co-pending patent application WO2015/143189 mentioned above, it is now possible to do so. On the source-side, rather than having access to different measurement devices, the multiple measurements may result from emitting different types of wavefield. For example, a source array using marine vibrators could be used to alternate between emitting an approximately omni-directional source wavefield (by having each element within the source array operating in phase) and emitting a directive wavefield (for example, by having one subset of elements within the array sweeping in anti-phase to a second subset of the elements within the array). Thus different wavefields can be generated using the same marine vibrators.

The benefits of these multi-channel measurements are well known, enabling interpolation/reconstruction to higher orders of aliasing than is possible using only single-channel (single source type) measurements. This can be referred to as "Beyond-Nyquist" reconstruction.

Such multi-channel measurements may be incorporated within the joint processing framework. The characteristics of these measurements are described within the farfield radiation pattern of the source (as mentioned in co-pending application PCT/US15/028002 entitled WAVEFIELD RECONSTRUCTION of Ozbek et al., the disclosure of which is incorporated herein by reference). Above we described this radiation pattern as $S(f, p_{x_i}, p_{y_j})$. If the radiation pattern is different for different sources, then it's definition can be extended to include the spatial co-ordinates of each source, i.e., $S(f, x, y, p_{x_i}, p_{y_j})$. This term is still described in the same data domain, and the same transform domain, and hence requires no change to the joint solution described above, and hence multi-channel reconstruction is also a possibility within the joint processing framework.

Iterative Solution

Figure 5A:
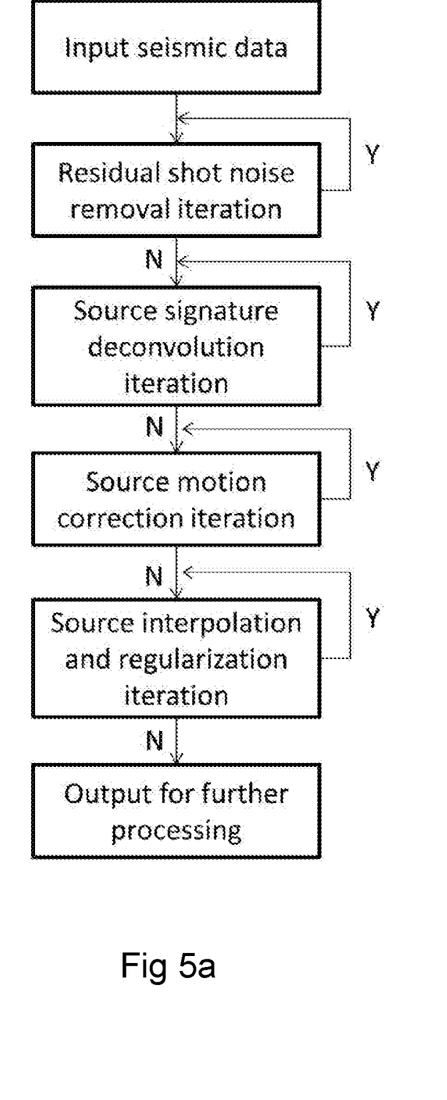
FIG. 5(a) exemplifies a processing flow where source-related acquisition effects are removed from the seismic data using iterative approaches, handling a different acquisition effect in each step.
Figure 5B:
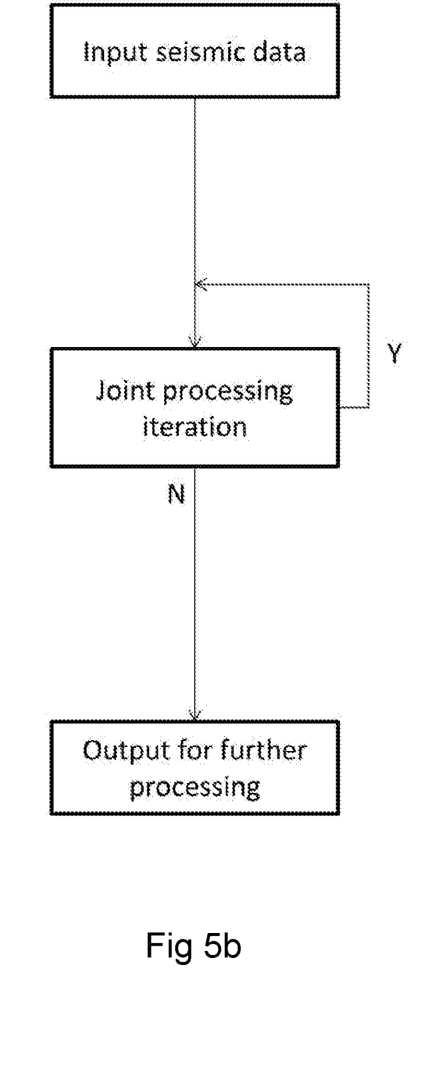
FIG. 5(b) exemplifies a processing flow that uses an iterative solution of the joint processing framework from various embodiments of the current disclosure.

The above methods require some sort of inverse problem solution. Many types of solution to these problems exist, and are well known to those skilled in the art. For example, least squares solutions, L1 constrained solutions, or sparsity promoting solutions. One such method to solve these problems may be to use an iterative solution, for example, using a method such as matching pursuit (as mentioned in U.S. Pat. No. 7,817,495 which in turn refers to Mallat and Mallat "Matching pursuits with time-frequency dictionaries" IEEE Transactions on Signal Processing, vol. 41, no. 12, pp. 3397-3415 (1993) and in WO2015/168,130). In the case where each processing step is solved sequentially, a number of iterations will be used to solve each step, as shown schematically in FIG. 5a where the letters Y and N indicate the decision whether a further iteration is required. The number of iterations may be constrained by an upper limit, but each step may require, say, 50 iterations so that the total number of iterations then becomes 200. For the joint processing as in FIG. 5b, the total number of iterations is still 50, substantially fewer iterations than in FIG. 5a.

The description above is given as explanation and exemplification. It is not intended to be comprehensive. Other effects may also be reduced or removed in the joint processing, for example, the separation of simultaneous sources and the removal of water layer multiples.

The method is not limited to the use of the frequency slowness domain as the transform domain. Neither is the method limited to the use of linear sweeps, or swept frequency marine vibrators. The method may be extended to include pseudo-random sweeps, sweeps with deliberately omitted frequency bands, sweeps emitted from two or more devices, and so on. The seismic sources may also be resonant devices, marine airguns etc.

Once the acquisition effects are removed from marine seismic measurements using the joint process, the cleaned marine seismic measurements can better represent the Earth reflection. They may be processed further with any known methods and eventually be used to identify and differentiate subsurface Earth structures.

In the procedure described above, source-side acquisition effects are removed from seismic data acquired using an ocean bottom recording system. In towed marine seismic surveys, the source acquisition may be constrained by being towed by the same vessel as the recording streamer system (although in some cases, separate source vessels are also used). However, even though the source acquisition geometry is constrained in a different way, the source acquisition effects are the same as or very similar to those present when using ocean bottom receivers. The procedure described above is not dependent on specifics of the receiver system and so the methodology described above for the ocean bottom case can be used to reduce or remove the source-side acquisition effects present in towed marine and other types of seismic surveys.

In summary, marine seismic data can be processed to remove or reduce two or more source side acquisition effects jointly when 1) the effects are placed in the same data domain as the received data and 2) the effects are described using the same basis functions which may signify representing the received data and the effects in the same chosen transform domain. The data domain may be a common-node gather, a common-receiver gather or a common-offset gather. The transform domain may be the frequency-slowness domain, the tau-p domain, the frequency-wavenumber domain, the curvelet domain, or the wavelet domain. The data effects may include source signature removal, source radiation pattern removal, residual shot noise suppression and data regularization, multi-channel reconstruction or regularization, prediction of sea surface multiples, separation of simultaneous sources etc. The joint processing can use iterative or non-iterative inversion technique, where the iterative inversion technique may be a matching pursuit technique.

The example embodiments described in detail above can be modified and varied within the scope of the concepts which they exemplify. Features referred to above or shown in individual embodiments above may be used separately or together in any combination so far as this is possible. Accordingly, all such modifications are intended to be included within the scope of this disclosure as defined in the following claims.

What is claimed is:

1. A method for processing marine seismic measurements from a marine seismic survey to identify subsurface structures of the Earth, comprising:

using a computer processor:
  representing the seismic measurements and a plurality of acquisition effects in a same data domain and by a same set of basis functions;
  concurrently processing the seismic measurements with the plurality of acquisition effects, wherein the concurrent processing removes at least two different types of acquisition effects of the plurality of acquisition effects from the seismic measurements as a result of the same set of basis functions representing each of the at least two different types of acquisition effects and the seismic measurements;
  outputting the processed seismic measurements, which includes building an image of a survey area to enable identification of subsurface structures of the Earth.

2. The method of claim 1, wherein the data domain is a common-node gather, common-receiver gather, or common-offset gather.

3. The method of claim 1, wherein the basis functions represent the seismic measurements and the acquisition effects in a single transform domain.

4. The method of claim 3, wherein the transform domain is a frequency-slowness domain, a tau-p domain, a frequency-wavenumber domain, a curvelet domain, or a wavelet domain.

5. The method of claim 1, wherein the processing to remove at least some of the plurality of acquisition effects comprises two or more of source signature removal, source radiation pattern removal, residual shot noise suppression, or data regularization.

6. The method of claim 5, wherein the processing to remove at least some of the plurality of acquisition effects further comprises one or more of:
  prediction of sea surface multiples;
  beyond Nyquist multi-channel reconstruction/regularization; or
  separation of additional simultaneous sources.

7. The method of claim 1, wherein the processing uses an iterative inversion technique.

8. The method of claim 7, wherein the processing uses a matching pursuit technique.

9. The method of claim 1, wherein the marine seismic survey comprises a survey generated using at least one marine vibrator as seismic source.

10. The method of claim 1, wherein the marine seismic survey comprises a survey generated using seismic sensors deployed on a seabed.

11. The method of claim 1, wherein the marine seismic survey comprises a survey generated using at least one towed streamer containing seismic sensors.

12. The method of claim 1, wherein the method includes receiving recorded seismic measurements through an interface of the computer processor.

13. A method of carrying out a marine seismic survey to identify undersea structures of the Earth, wherein the method comprises processing data by a method as in claim 1.

14. The method of claim 1, wherein the at least two different types of acquisition effects are source-side acquisition effects that do not result from features of the Earth.

15. The method of claim 14, wherein the same basis functions represent the seismic measurements and the at least two different types of source-side acquisition effects include at least two of: (i) source motion; (ii) input data geometry; (iii) source signature; (iv) radiation pattern; or (v) residual shot noise.

16. The method of claim 15, wherein the basis functions represent the seismic measurements and the at least two different types of source-side acquisition effects in a common-node domain by using a frequency-slowness domain as a transform domain.

17. A system comprising:
  an interface to receive seismic measurements from a marine seismic survey to identify subsurface structures of the Earth; and
  a computer processor to
    represent the received seismic measurements and at least two different types of acquisition effects in a same data domain and by a same set of basis functions;
    concurrently process the seismic measurements with the at least two different types of acquisition effects, which thereby removes the at least two different types of acquisition effects from the seismic measurements as a result of the same set of basis functions representing each of the at least two different types of acquisition effects and the seismic measurements;
    output the processed seismic measurements; and
    use the output processed seismic measurements by at least one of:
      building up an image of a survey area corresponding to the marine seismic survey;
      identifying a geological formation in the subsurface structures of the Earth; or
      identifying a probably location of a hydrocarbon deposit in the subterranean structures of the Earth.

18. The system according to claim 17, wherein processing the measurements and acquisition effects to remove acquisition effects is performed by iterative processing of the received measurements.

* * * * *